United States Patent
Tseng

(10) Patent No.: US 9,206,834 B2
(45) Date of Patent: Dec. 8, 2015

(54) FLOATING FASTENER

(71) Applicant: HANWIT PRECISION INDUSTRIES LTD., New Taipei (TW)

(72) Inventor: Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 0 days.

(21) Appl. No.: 14/204,405

(22) Filed: Mar. 11, 2014

(65) Prior Publication Data

US 2015/0260216 A1 Sep. 17, 2015

(51) Int. Cl.
*F16B 41/00* (2006.01)
*F16B 39/02* (2006.01)
*F16B 5/02* (2006.01)

(52) U.S. Cl.
CPC .............. *F16B 39/02* (2013.01); *F16B 5/0208* (2013.01); *F16B 41/002* (2013.01)

(58) Field of Classification Search
CPC ......... F16B 41/002; F16B 35/06; F16B 23/00
USPC .................. 411/107, 352, 999, 353
See application file for complete search history.

(56) References Cited

U.S. PATENT DOCUMENTS

| | | | | |
|---|---|---|---|---|
| 5,544,992 A | * | 8/1996 | Ciobanu et al. | 411/353 |
| 6,033,168 A | * | 3/2000 | Creely et al. | 411/107 |
| 6,079,923 A | * | 6/2000 | Ross et al. | 411/353 |
| 6,814,530 B2 | * | 11/2004 | Franco et al. | 411/353 |
| 7,938,607 B2 | * | 5/2011 | Wang | 411/107 |
| 8,371,786 B2 | * | 2/2013 | Chiu | 411/353 |
| 8,939,691 B2 | * | 1/2015 | Tseng | 411/347 |
| 2005/0047889 A1 | * | 3/2005 | Lee | 411/352 |
| 2013/0294863 A1 | * | 11/2013 | Tseng | 411/175 |
| 2014/0119850 A1 | * | 5/2014 | Bentrim | 411/22 |

\* cited by examiner

*Primary Examiner* — Flemming Saether
(74) *Attorney, Agent, or Firm* — Muncy, Geissler, Olds & Lowe, P.C.

(57) ABSTRACT

A floating fastener includes a mounting base member affixed to a first panel member and including a relatively smaller lower outer perimeter, a relatively larger upper outer perimeter, an outer stop flange extending around a top side of the upper outer perimeter, a bottom mounting neck and a cushion ring mounted in a locating groove around the lower outer perimeter, a rotary fastening member inserted through the mounting base member for locking a second panel member to the first panel member through a rotary motion, and a cap member affixed to a head of the rotary fastening member outside the mounting base member and having an inside bottom stop flange coupled to the mounting base member and axially slidable along the upper and lower outer perimeters and stoppable at the bottom side of the outer stop flange of the mounting base member.

13 Claims, 10 Drawing Sheets

FLOATING FASTENER

BACKGROUND OF THE INVENTION

1. Field of the Invention

The present invention relates to fastener means for detachably securing two panel members together, and more particularly to a floating fastener consisting of a mounting base member, a rotary fastening member and a cap member, which facilitates mounting and dismounting without causing any component damage.

2. Description of the Related Art

When joining panel members, a fastening device formed of a lock screw, a rotary knob and a washer may be used. During application, the lock screw, rotary knob and washer of each fastening device are assembled and then mounted at a first panel member. When fastening the first panel member to a second panel member, rotate the rotary knob of each fastening device to drive the respective lock screw into a respective mounting screw hole at the second panel member, and then use a hand tool to fasten tight the lock screw. These fastening devices are widely used in server racks for telecommunication, industrial computers, machine tools, and other situations where multiple panel members are to be fastened in a stack. Further, a floating fastener formed of a cap member, a rotary fastening member, a spring member and a socket member has also been created for detachably fastening two panel members together by: affixing the socket member of the floating fastener to a mounting center opening of one panel member and then threading the spring-loaded screw member into a mounting screw hole of the other panel member. After separation between the two panel members, the floating fastener is kept secured to the respective panel member.

FIG. 10 illustrates a floating fastener according to the prior art. As illustrated, this design of floating fastener comprises a mounting base member A, which comprises a stepped center opening A0 having an annular step A3 on the middle, a bottom mounting flange A1 affixed to a panel member B and an outside stop flange A2 extending around the periphery of the top side thereof, a rotary fastening member C1 inserted through the mounting base member A, a spring member C11 mounted around the rotary fastening member C1 and stopped between the head of the rotary fastening member C1 and the outside stop flange A2 of the mounting base member A, and a cap member C affixed to the head of the rotary fastening member C1. The cap member C comprises an inside bottom stop flange C3 axially slidably coupled to the mounting base member A, and a plurality of longitudinal crevices C2 equi-angularly spaced around the periphery thereof and longitudinally cut through the inside bottom stop flange C3 for enabling the inside bottom stop flange C3 to be radially flexibly expanded and then coupled to the periphery of the mounting base member A. This design of floating fastener still has drawbacks as follows:

1. When moving the inside bottom stop flange C3 of the cap member C downwardly over the outside stop flange A2 of the mounting base member A to have the inside bottom stop flange C3 be coupled to the periphery of the mounting base member A after installation of the mounting base member A in the panel member B, the spring member C11 imparts a pressure to the cap member C in direction away from the mounting base member A, complicating the installation, and the mounting base member A may be accidentally biased relative to the mounting base member A or forced away from the mounting base member A.

2. When forcing the inside bottom stop flange C3 of the cap member C downwardly over the outside stop flange A2 of the mounting base member A, the inside bottom stop flange C3 may break or be permanently deformed.

3. The design of the longitudinal crevices C2 weakens the structural strength of the cap member C.

Therefore, it is desirable to provide an improvement design of floating fastener, which facilitates quick and accurate installation, prevents component damage.

SUMMARY OF THE INVENTION

The present invention has been accomplished under the circumstances in view. It is therefore the main object of the present invention to provide a floating fastener for detachably fastening two panel members together, which has the advantages of ease of use, high installation reliability and high positioning accuracy.

To achieve this and other objects of the present invention, a floating fastener of the present invention comprises a mounting base member, a rotary fastening member, and a cap member. The mounting base member comprises a center opening extending through opposing top and bottom sides thereof, a bottom mounting neck downwardly extended from the bottom side thereof and affixed to said first panel member, a relatively smaller lower outer perimeter and a relatively larger upper perimeter extending around the center opening at different elevations, a cushion ring mounted in the locating groove around said lower outer perimeter, and an outer stop flange extending around a top side of the upper outer perimeter. The rotary fastening member is inserted through the mounting base member for locking a second panel member to the first panel member through a rotary motion, having a head thereof suspending outside the mounting base member. The cap member is affixed to the head of the rotary fastening member outside the mounting base member, having an inside bottom stop flange coupled to the mounting base member and axially slidable along the upper and lower outer perimeters and stoppable at the bottom side of the outer stop flange of the mounting base member.

Further, the mounting base member further comprises a tapered outer surface portion connected between the lower outer perimeter and the upper outer perimeter a locating groove extending around the lower outer perimeter, and sloping downwardly inwards in direction from the upper outer perimeter toward the lower outer perimeter.

Preferably, the cap member further comprises a grip formed integral with and extending around the periphery thereof. The grip comprises a plurality of tool gripping planes and finger gripping portions alternatively arranged around the periphery of said cap member.

Further, each finger gripping portion can be selectively made in a series of longitudinal teeth, an embossed pattern, an array of raised portions, or any anti-slip design for the gripping of the fingers. Further, the tool gripping planes of the cap member can be selectively made in a square configuration, hexagonal configuration, polygonal configuration, recessed square configuration, recessed hexagonal configuration or recessed polygonal configuration for the positioning of an open-end wrench, socket wrench, ratchet wrench, spanner or any other hand tool to rotate the cap member and the rotary fastening member relative to the mounting base member.

Further, the center opening of the mounting base member can be made in the form of a stepped hole having relatively larger upper part that defines an inside chamber and an annular step so that a spring member can be mounted around the rotary fastening member and stopped between the flat bottom wall of the head of the rotary fastening member and the annular step of the mounting base member.

Preferably, the mounting base member further comprises a mounting groove extending around the periphery of the bottom mounting neck for enabling the mounting neck to be positively and accurately riveted, bonded or welded to a mounting hole in the first panel member.

Further, the outer stop flange of the mounting base member has a diameter larger than the diameter of the upper outer perimeter and the outer diameter of the cushion ring. Before mounting the mounting base member in the first panel member, the cap member can be lowered to force the inside bottom stop flange downwardly over the cushion ring and to have the inside bottom stop flange be temporarily stopped below the cushion ring, enabling the floating fastener to be conveniently picked up by a vacuum suction device and then delivered to the first panel member for installation without causing component displacement.

DETAILED DESCRIPTION OF THE PREFERRED EMBODIMENT

Figure 1:
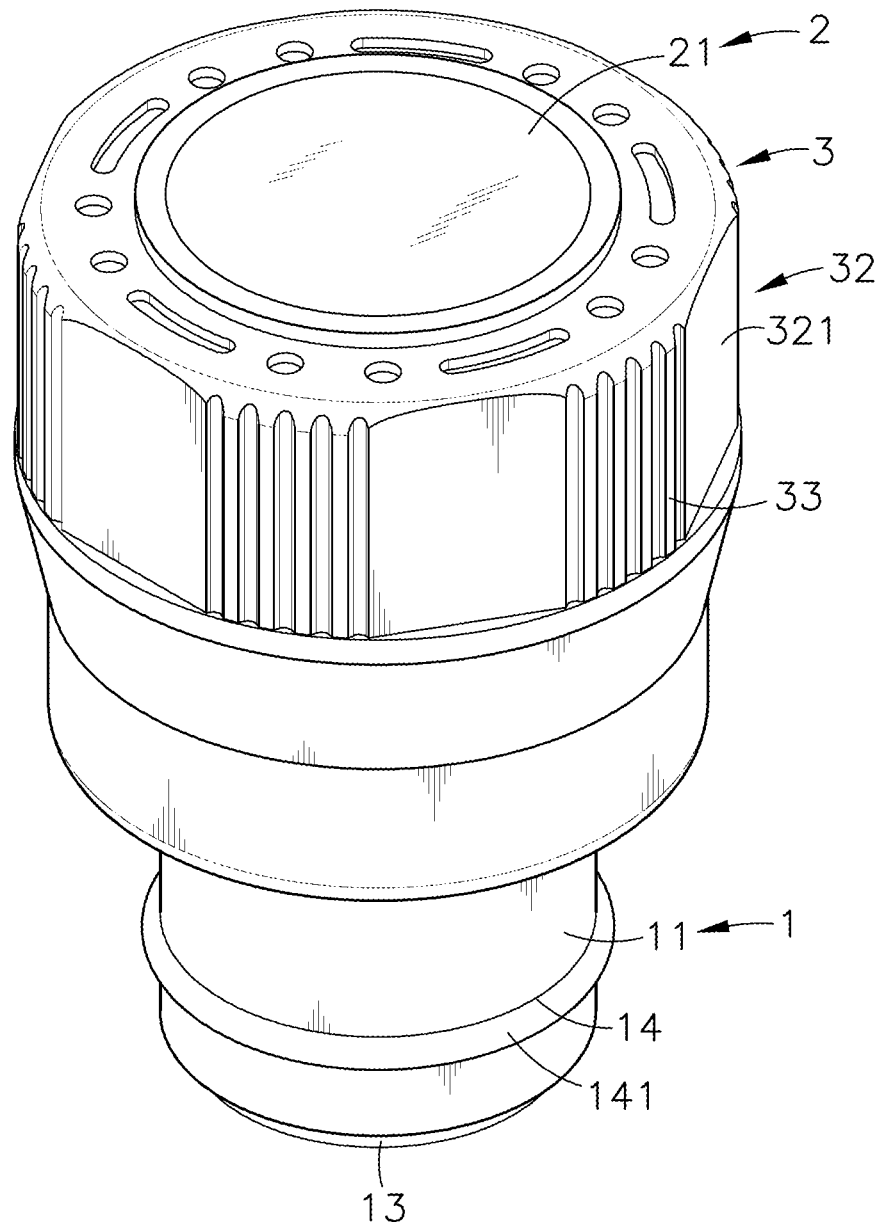
FIG. 1 is an oblique top elevational view of a floating fastener in accordance with the present invention.
Figure 2:
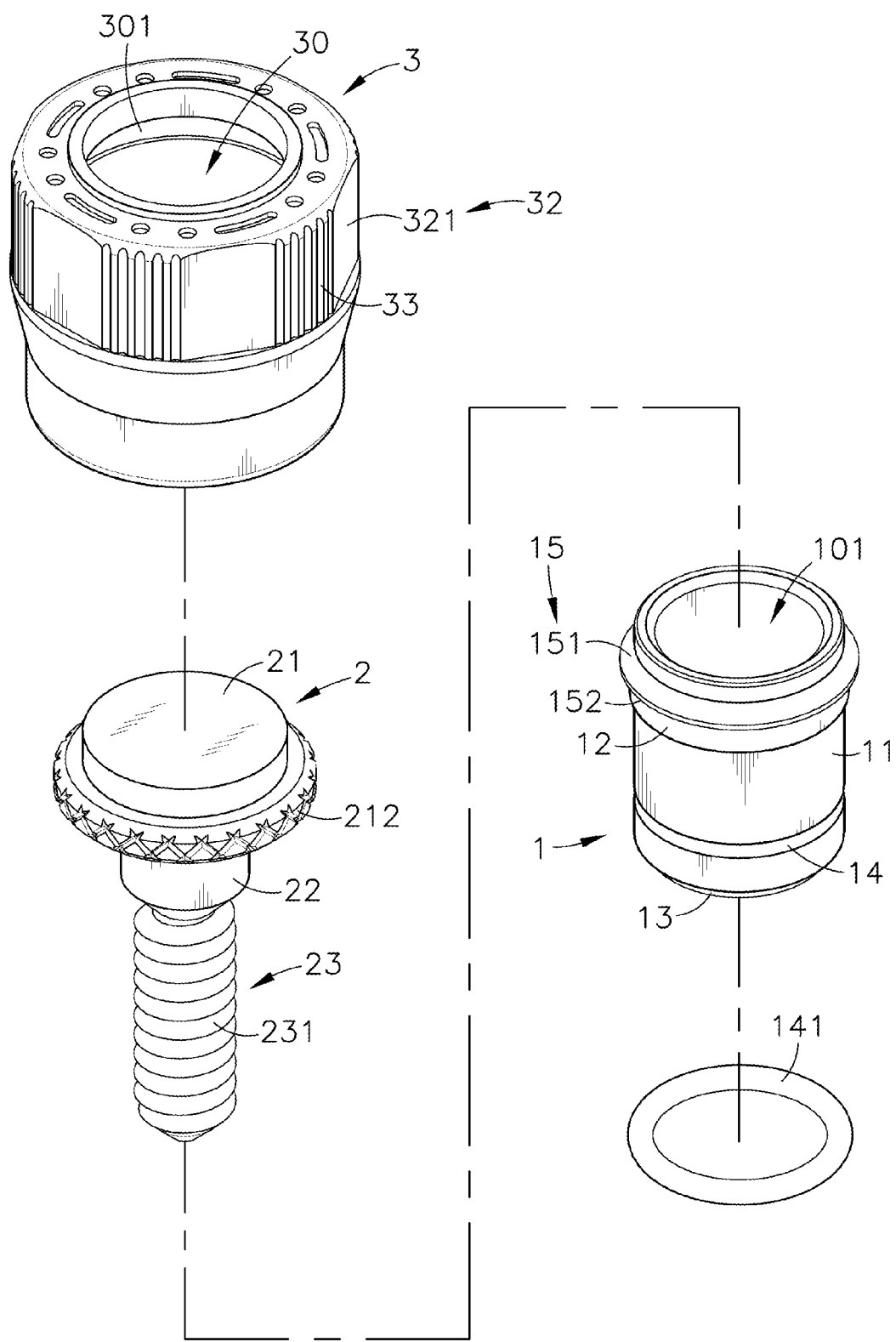
FIG. 2 is an exploded view of the floating fastener in accordance with the present invention.
Figure 3:
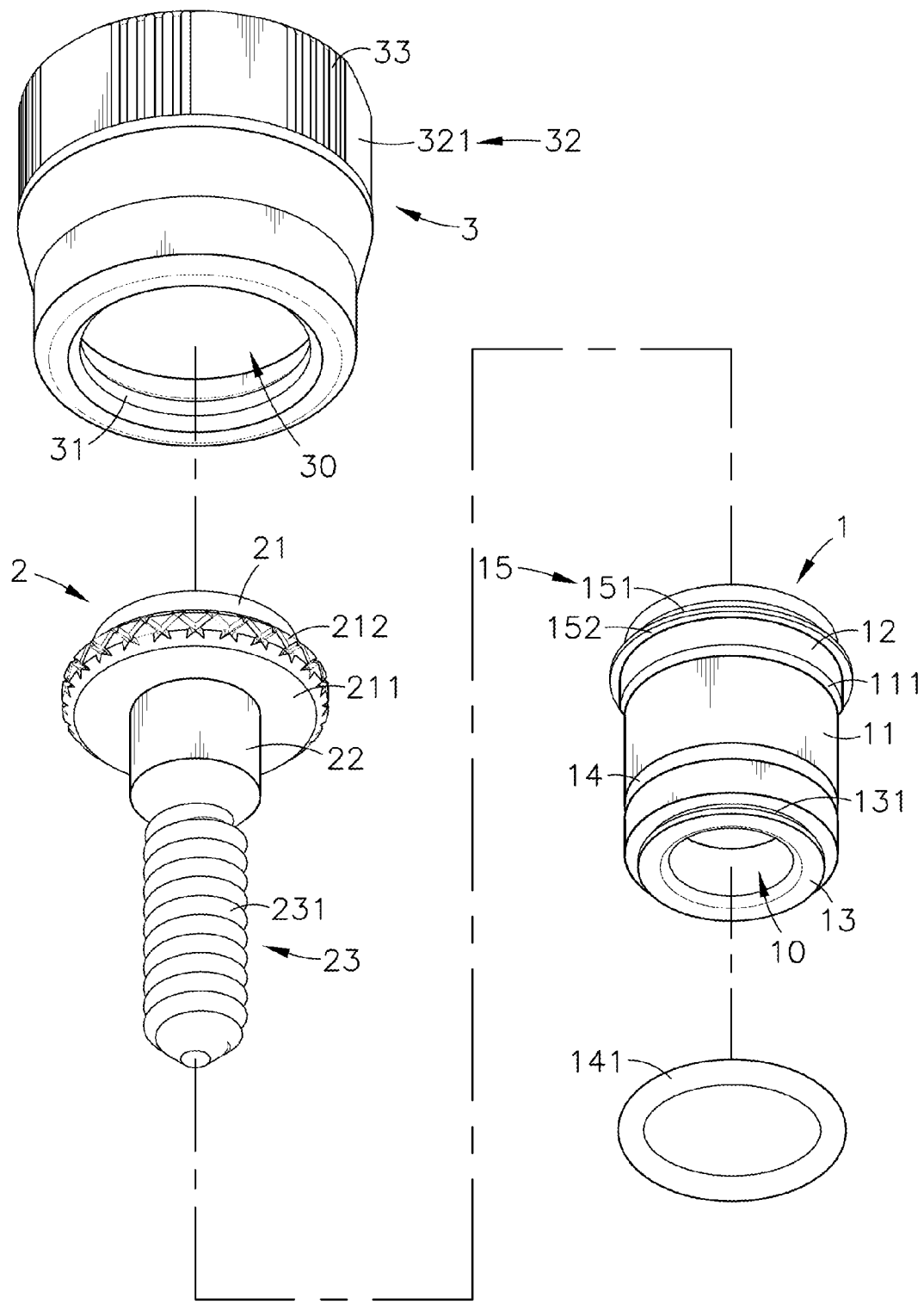
FIG. 3 corresponds to FIG. 2 when viewed from another angle.
Figure 4:
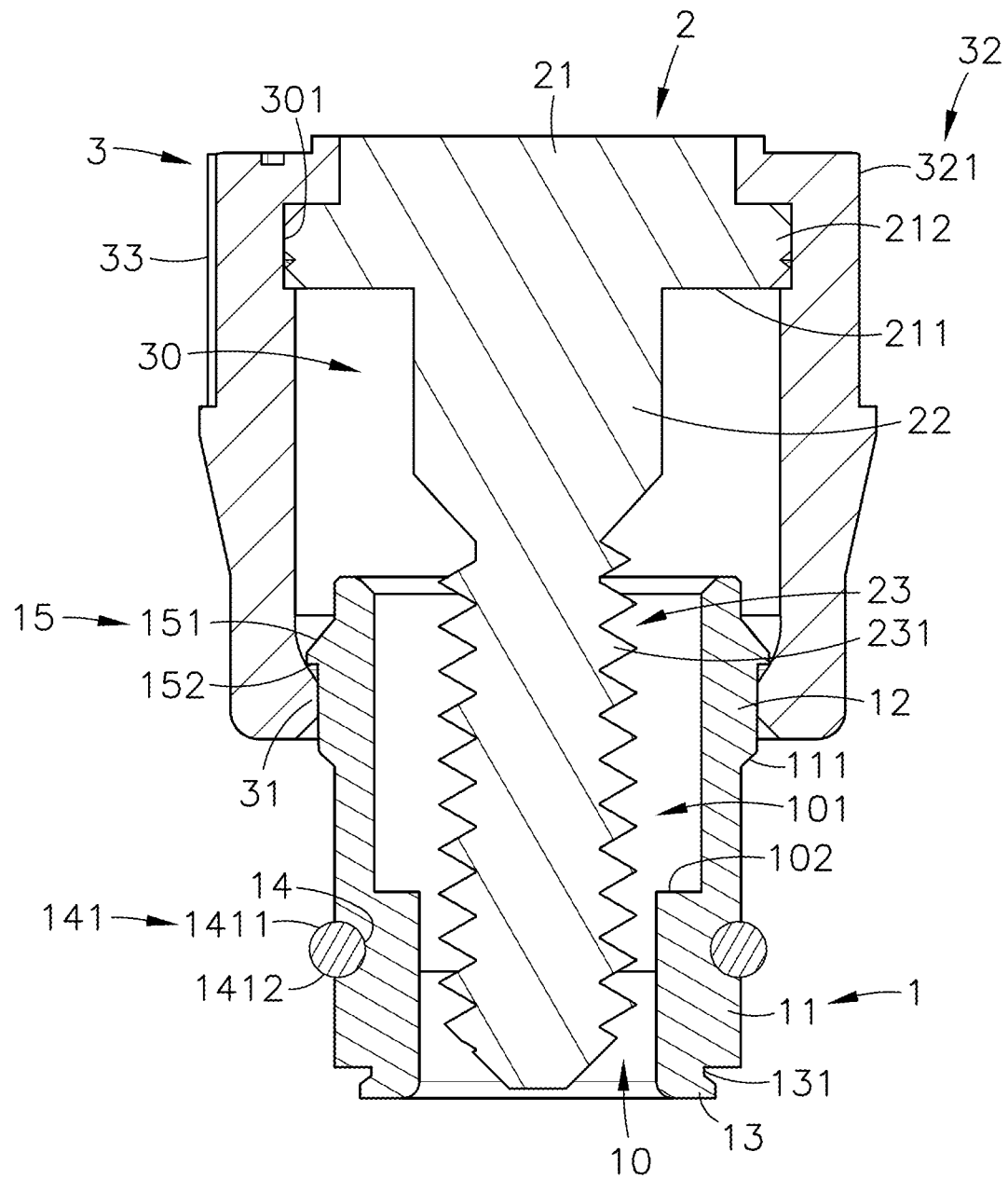
FIG. 4 is a sectional side view of the floating fastener in accordance with the present invention.
Figure 5:
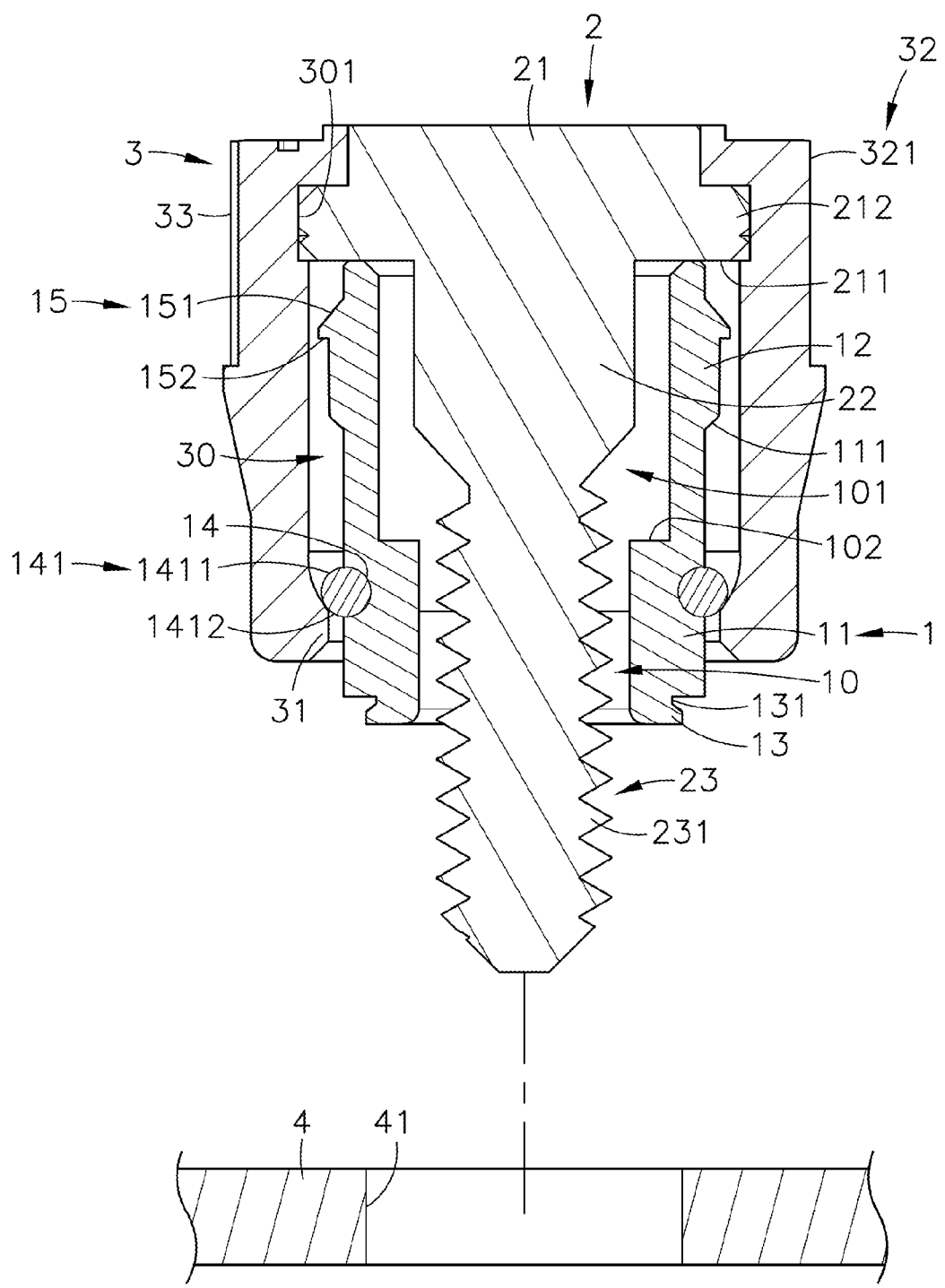
FIG. 5 is a sectional side view of the present invention, illustrating the status of the floating fastener before installation in a first panel member.
Figure 6:
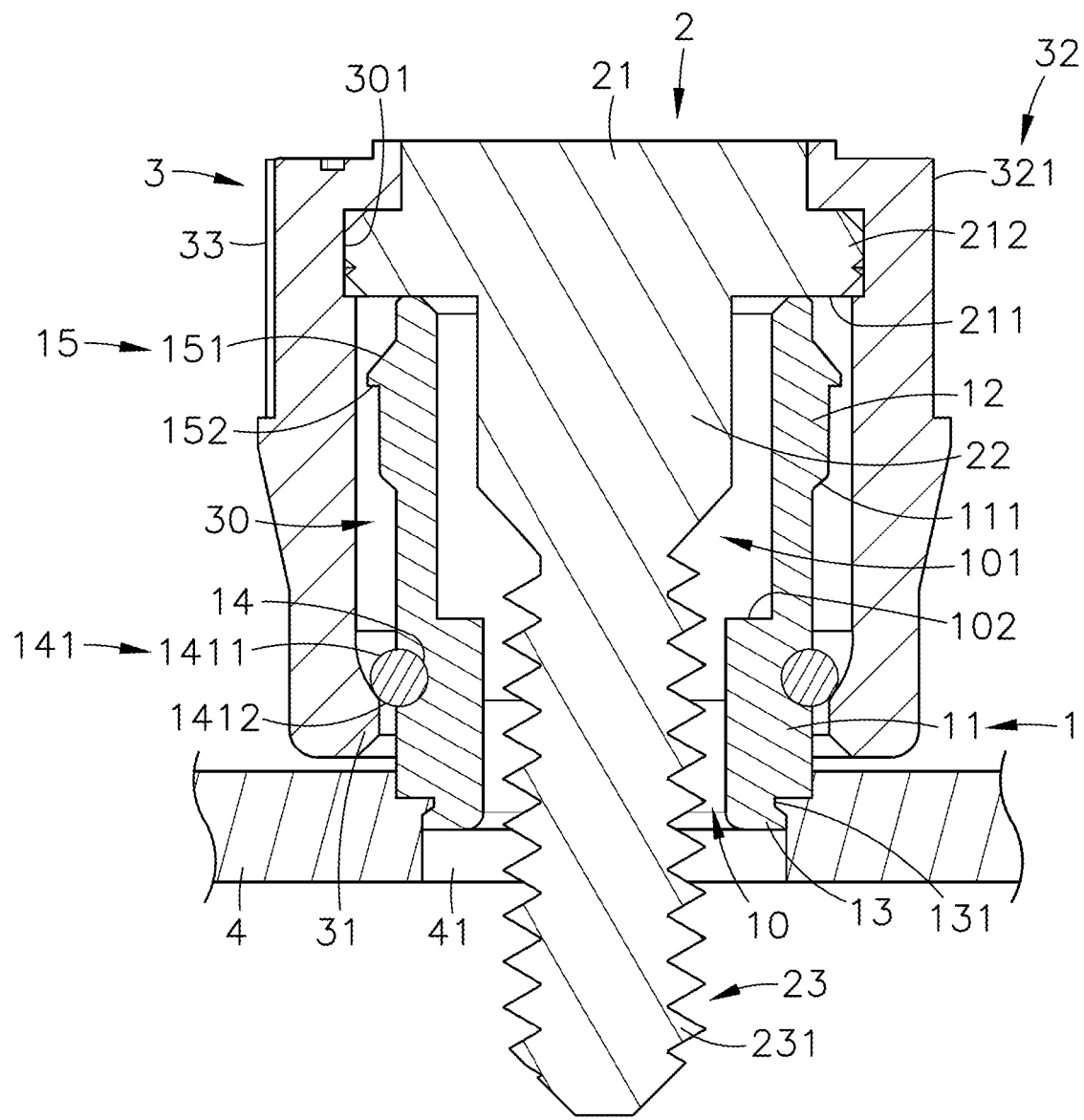
FIG. 6 corresponds to FIG. 5, illustrating the mounting base member of the floating fastener affixed to the first panel member.
Figure 7:
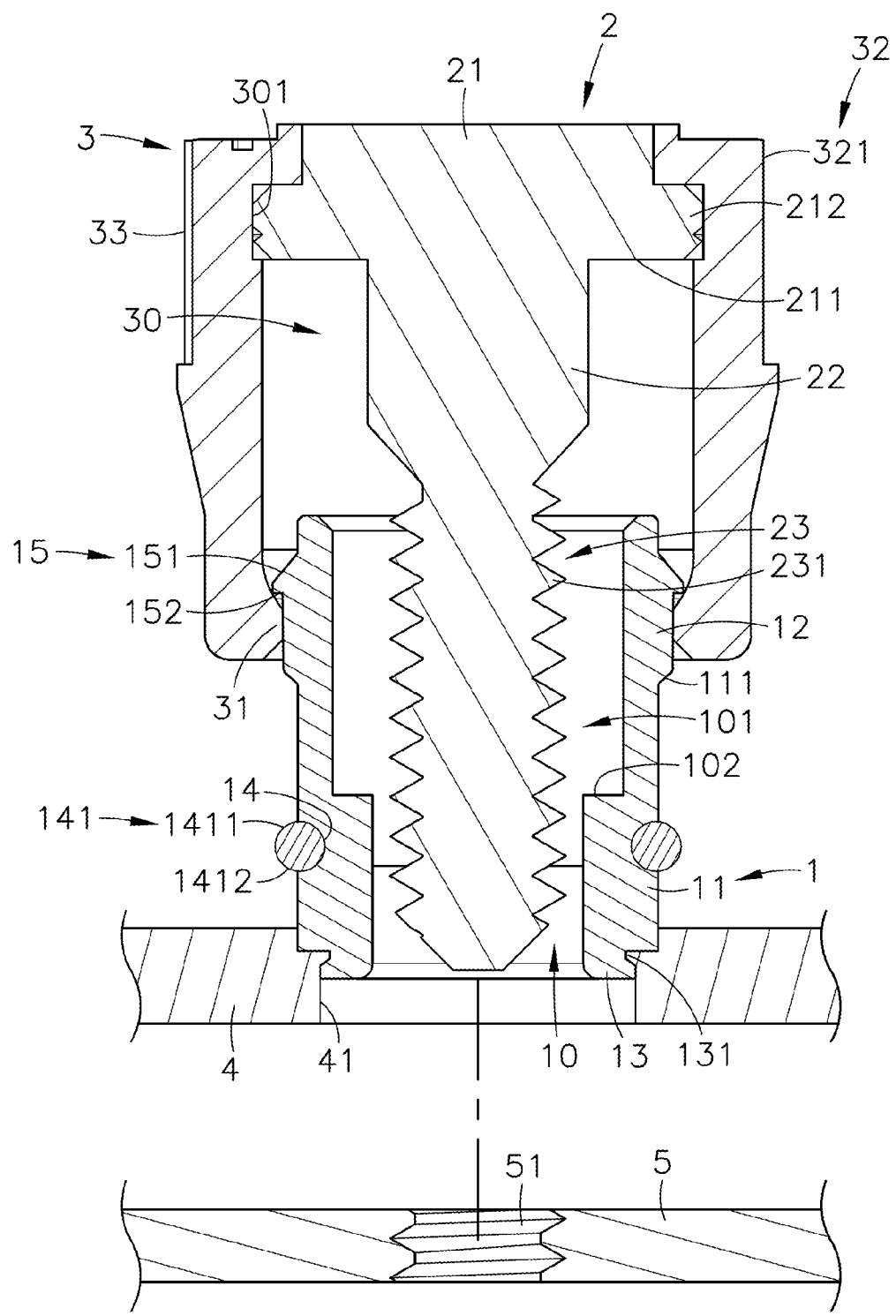
FIG. 7 corresponds to FIG. 6, illustrating the cap member lifted and the screw rod of the rotary fastening member received inside the mounting base member before installation of the floating fastener in a second panel member.
Figure 8:
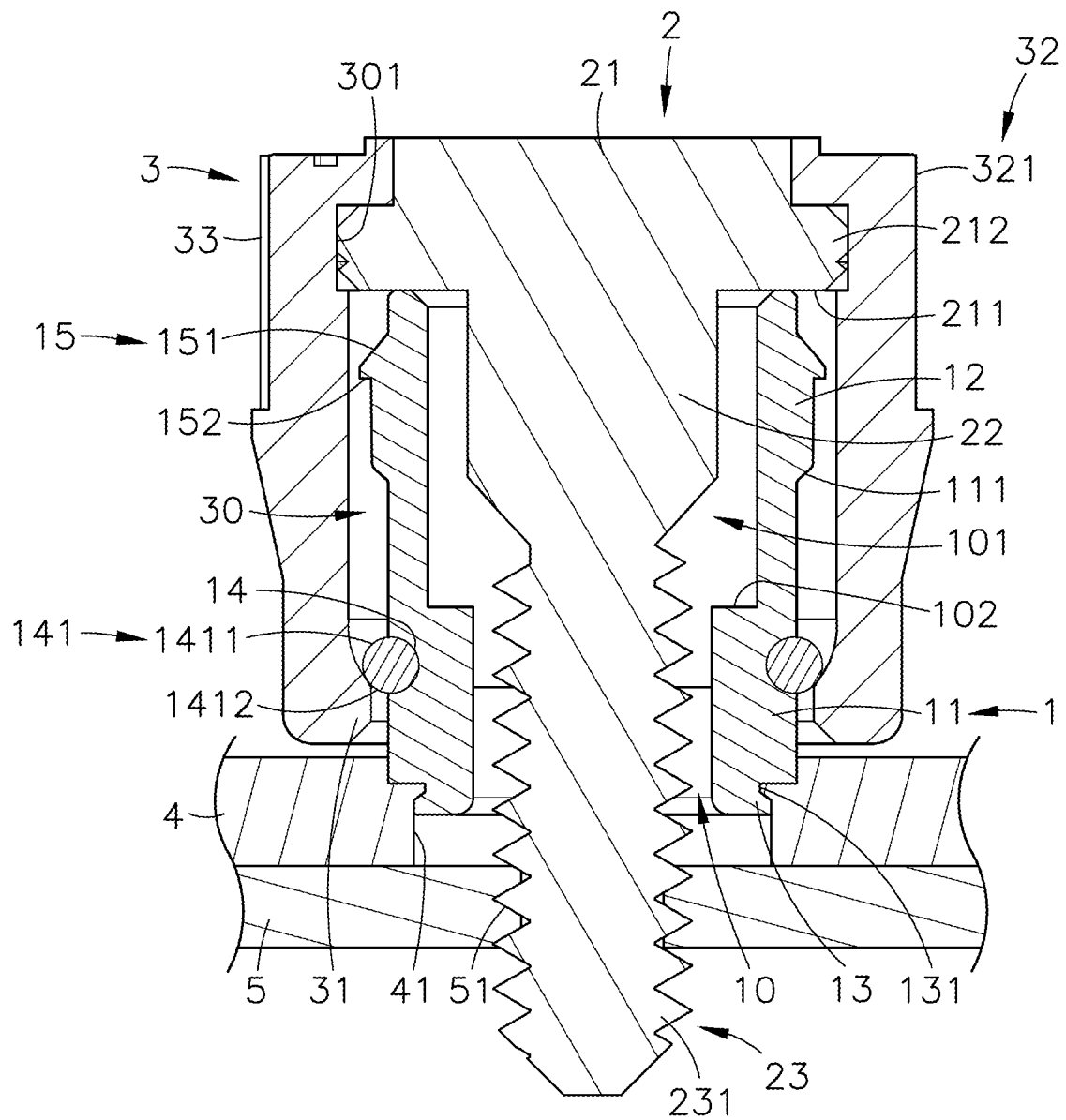
FIG. 8 corresponds to FIG. 7, illustrating the screw rod of the rotary fastening member fastened to the mounting screw hole of the second panel member.

Referring to FIGS. 1-4, a floating fastener in accordance with the present invention is shown. The floating fastener comprises a mounting base member 1, a rotary fastening member 2, and a cap member 3.

The mounting base member 1 is an open-ended cylindrical member comprising a center opening 10 axially extending through opposing top and bottom sides thereof, a lower outer perimeter 11 extending around a lower part of the center opening 10, an upper outer perimeter 12 extending around an upper part of the center opening 10 and having an outer diameter larger than the lower outer perimeter 11, a tapered outer surface portion 111 connected between the lower outer perimeter 11 and the upper outer perimeter 12, a bottom mounting neck 13 downwardly extended from the bottom side thereof around the center opening 10, a mounting groove 131 extending around the periphery of the bottom mounting neck 13, a locating groove 14 extending around the lower outer perimeter 11 near the bottom mounting neck 13, a cushion ring 141 mounted in the locating groove 14 around the lower outer perimeter 11 and defining a tapered top guide surface portion 1411 and a bottom bearing surface portion 1412, and an outer stop flange 15 extending around a top side of the upper outer perimeter 12. The outer stop flange 15 has a diameter larger than the diameter of the upper outer perimeter 12 and the outer diameter of the cushion ring 141, defining a tapered top thrust surface portion 151 and a flat bottom stop surface portion 152.

The rotary fastening member 2 comprises a head 21 suspending above the mounting base member 1, an engagement portion 212 made in the form of an array of teeth, an embossed pattern, an array of tiny protrusions or any of a variety of other positioning designs and disposed around the periphery of the head 21, a shoulder 22 perpendicularly downwardly extended from a center area of a flat bottom wall 211 of the head 21 and inserted into the center opening 10 of the mounting base member 1, a screw rod 23 axially extended from a bottom end of the shoulder 22 opposite to the head 21 in a concentric manner and defining a spiral outer thread 231 around the periphery thereof, and a tool-positioning means (not shown) formed in an opposing top wall of the head 21 for the positioning of a hand tool for rotating the rotary fastening member 2. The tool-positioning means can be made in the form of a straight slot, crossed slot, star shaped slot or hexagonal slot, or in the form of a straight block, crossed block, star shaped block or hexagonal block.

The cap member 3 comprises an accommodation open space 30 surrounded by an inside wall thereof and extending through opposing top and bottom sides thereof, an inside locating groove 301 extending around the inside wall near the top side for engagement with the engagement portion 212 of the rotary fastening member 2, an inside bottom stop flange 31 extended around the inside wall at a bottom side of the accommodation open space 30, and a grip 32 formed integral with and extending around the periphery thereof. The grip 32 comprises a plurality of tool gripping planes 321 and finger gripping portions 33 alternatively arranged around the periphery of the cap member 3.

When assembling the floating fastener, insert the screw rod 23 and shoulder 22 of the rotary fastening member 2 into the center opening 10 of the mounting base member 1 to let the head 21 of the rotary fastening member 2 be disposed outside the mounting base member 1, and then cap the cap member 3 on the head 21 of the rotary fastening member 2 to force the inside locating groove 301 of the cap member 3 into engagement with the engagement portion 212, and then lower the cap member 3 to move the inside bottom stop flange 31 of the cap member 3 over the tapered top thrust surface portion 151 of the outer stop flange 15 of the mounting base member 1 by force, enabling the inside bottom stop flange 31 of the cap member 3 to be slidably coupled to the mounting base member 1 and axially movable relative to the mounting base member 1 along the lower outer perimeter 11, tapered outer surface portion 111 and upper outer perimeter 12 of the mounting base member 1 below the outer stop flange 15, then lower the cap member 3 to move the inside bottom stop flange 31 of the cap member 3 downwardly over the tapered top guide surface portion 1411 and bottom bearing surface portion 1412 of the cushion ring 141 in the locating groove 14 around the lower outer perimeter 11. Thus, the mounting base member 1, the rotary fastening member 2 and the cap member 3 are assembled, forming the desired floating fastener.

Further, in this preferred embodiment, the mounting base member 1 and the rotary fastening member 2 are metal members of one-piece design. Further, the cap member 3 can be directly molded on the head 21 of the rotary fastening member 2 by insert molding. Alternatively, the rotary fastening member 2 and the cap member 3 can be separately made and then fastened together by forcing the engagement portion 212 of the rotary fastening member 2 into friction engagement with the inside locating groove 301 of the cap member 3. Further, in this preferred embodiment, the inside bottom stop flange 31 of the cap member 3 is stopped below the flat bottom stop surface portion 122 of the outer stop flange 15 of the mounting base member 1 to prohibit the rotary fastening member 2 from escaping out of the mounting base member 1. However, this design of preventing the rotary fastening member 2 from escaping out of the mounting base member 1 is not a limitation. C-shaped retainer, ring cushion or any other stoppage device can be used and mounted between the mounting base member 1 and the rotary fastening member 2 to let the rotary fastening member 2 be moved with the cap member 3 axially relative to the mounting base member 1 and prohibit the rotary fastening member 2 from falling out of the mounting base member 1.

Further, the length (vertical height) of the upper outer perimeter 12 of the mounting base member 1 is shorter than the length (vertical height) of the lower outer perimeter 11; the tapered outer surface portion 111 of the mounting base member 1 slopes downwardly inwardly in direction from the upper outer perimeter 12 toward the lower outer perimeter 11. Further, the mounting base member 1, the rotary fastening member 2 and the cap member 3 can be conveniently assembled together without loading a spring member, preventing spring resistance and avoiding the rotary fastening member 2 and the cap member 3 from being forced out of the mounting base member 1 accidentally by spring force during the assembly process. Further, the cap member 3 is a one piece member having a high structural strength. Further, the inner and outer edges of the inside bottom stop flange 31 of the cap member 3 are preferably beveled so that the inside bottom stop flange 31 can be conveniently moved over the tapered outer surface portion 111 of the mounting base member 1 and the tapered top guide surface portion 1411 and bottom bearing surface portion 1412 of the cushion ring 141 without less effort and without causing damage to the cap member 3.

Further, the tool gripping planes 321 of the grip 32 can be designed to provide a square, hexagonal or any other polygonal configuration, or a recessed square, hexagonal or any other polygonal configuration for the positioning of an open-end wrench, socket wrench, ratchet wrench, spanner or any other hand tool to rotate the cap member 3 and the rotary fastening member 2 relative to the mounting base member 1. Further, the finger gripping portions 33 are respectively disposed between each two adjacent tool gripping planes 321. Further, each finger gripping portion 33 can be made in the form of a series of longitudinal teeth, an embossed pattern, an array of raised portions, or any anti-slip design for the gripping of the fingers and for enabling the cap member 3 and the rotary fastening member 2 to be conveniently rotated relative to the mounting base member 1 by hand.

Referring to FIGS. 5-8 and FIGS. 2 and 4 again, the floating fastener can be used in a telecommunication server rack, computer server, machine tool, board set structure, cabinet or keyboard rack, or other situations where multiple panel members are to be fastened in a stack. For example, the floating fastener can be installed in a first panel member 4 in a server case to detachably fasten a second panel member 5 to the first panel member 4, wherein the server case houses a motherboard, power supply device, data access equipment, interface cards and/or other electronic devices. When installing the floating fastener in the first panel member 4, lower the cap member 3 to move the inside bottom stop flange 31 of the cap member 3 downwardly over the cushion ring 141 (see FIG. 5). Thereafter, insert the bottom mounting neck 13 of the mounting base member 1 into a mounting hole 41 of the first panel member 4, enabling the mounting groove 131 of the bottom mounting neck 13 of the mounting base member 1 to be riveted, bonded or welded to the first panel member 4 positively and accurately (see FIG. 6). After installation of the floating fastener in the first panel member 4, the first panel member 4 attached to the second panel member 5 to keep the mounting hole 41 of the first panel member 4 in axial alignment with a mounting screw hole 51 of the second panel member 5 (see FIG. 7), and then lower the cap member 3 relative to the mounting base member 1 and rotate the cap member 3 to drive the spiral outer thread 231 of the screw rod 23 of the rotary fastening member 2 into the mounting screw hole 51 of the second panel member 5 (see FIG. 8). When threading the spiral outer thread 231 of the screw rod 23 of the rotary fastening member 2 into the mounting screw hole 51 of the second panel member 5, the inside bottom stop flange 31 of the cap member 3 is moved downwardly along the lower outer perimeter 11 over the tapered top guide surface portion 1411 of the cushion ring 141 to the bottom side of the bottom bearing surface portion 1412, and thus threading the spiral outer thread 231 into the mounting screw hole 51 does not receive any resistance from the cap member 3.

Further, during the aforesaid installation procedure, the user can grip the finger gripping portions 33 of the cap member 3 with the fingers and then rotate the cap member 3 and the rotary fastening member 2 with the hand to thread the spiral outer thread 231 of the screw rod 23 into the mounting screw hole 51 of the second panel member 5, and then use a power hand tool, or a hand tool (open-end wrench, spanner, ratchet wrench, etc.) to fasten tight the rotary fastening member 2. By means of directly rotating the cap member 3 with the bare hand to drive the screw rod 23 of the rotary fastening member 2 into the mounting screw hole 51 of the second panel member 5 at the initial stage, the screw rod 23 of the rotary fastening member 2 can be accurately fastened to the mounting screw hole 51 of the second panel member 5 without causing thread damage. After the screw rod 23 of the rotary fastening member 2 has been accurately fastened to the mounting screw hole 51 of the second panel member 5, the cap member 3 can then be rotated with a power hand tool or hand tool to fasten tight the screw rod 23 of the rotary fastening member 2, thereby positively locking the first panel member 4 to the second panel member 5.

When going to remove the first panel member 4 from the second panel member 5, grip the finger gripping portions 33 of the grip 32 of the cap member 3 with the fingers and then rotate the cap member 3 in the reversed direction to disengage the screw rod 23 of the rotary fastening member 2 from the mounting screw hole 51 of the second panel member 5. When disengaging the screw rod 23 of the rotary fastening member 2 from the mounting screw hole 51 of the second panel member 5, the inside bottom stop flange 31 of the cap member 3 is stopped at the bottom side of the bottom bearing surface portion 1412 of the cushion ring 141, prohibiting the rotary fastening member 2 from retracting into the center opening 10 of the mounting base member 1. As stated above, subject to the design of the finger gripping portions 33 of the grip 32 of the cap member 3, the user can rotate the cap member 3 directly with the fingers to disengage the screw rod 23 of the rotary fastening member 2 from the mounting screw hole 51 of the second panel member 5, allowing the first panel member 4 to be rapidly detached from the second panel member 5. The user can also attach a power hand tool or hand tool (open-end wrench, spanner, ratchet wrench, etc.) to the tool gripping portions 321 of the grip 32 of the cap member 3, and then operate the power hand tool or hand tool to rotate the cap member 3, disengaging the screw rod 23 of the rotary fastening member 2 from the mounting screw hole 51 of the second panel member 5. Thus, either with the fingers or by means of a power hand tool or hand tool, the user can conveniently disengage the screw rod 23 of the rotary fastening member 2 from the mounting screw hole 51 of the second panel member 5 with less effort.

After detached the first panel member 4 from the second panel member 5, the user can pull the cap member 3 to move the inside bottom top flange 31 upwardly over the cushion ring 141 to the lower outer perimeter 11 and then the upper outer perimeter 12 via the tapered outer surface portion 111, and thus, the inside bottom stop flange 31 of the cap member 3 can be stopped at the bottom side of the flat bottom stop surface portion 152 of the outer stop flange 15. Further, the aperture diameter of the inside bottom stop flange 31 is approximately equal to the outer diameter of the upper outer perimeter 12 of the mounting base member 1, thus, the inside bottom stop flange 31 can be temporarily positioned on the upper outer perimeter 12, enabling the screw rod 23 of the rotary fastening member 2 to be suspended inside the center opening 10 of the mounting base member 1.

Figure 9:
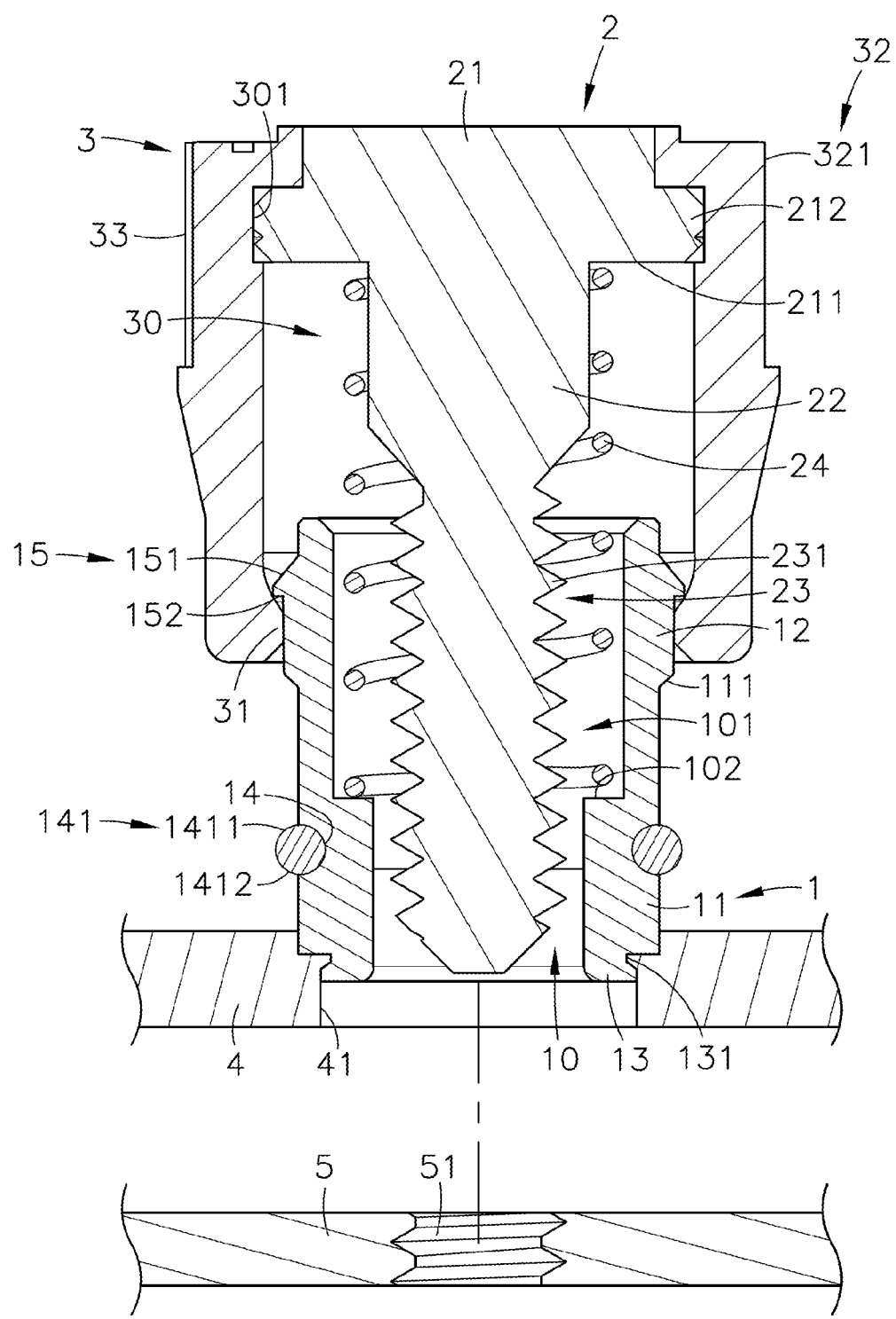
FIG. 9 is a schematic drawing of the present invention, illustrating a spring member mounted around the screw rod of the rotary fastening member and stopped between the flat bottom wall of the head of the rotary fastening member and the annular step of the mounting base member.
Figure 10:
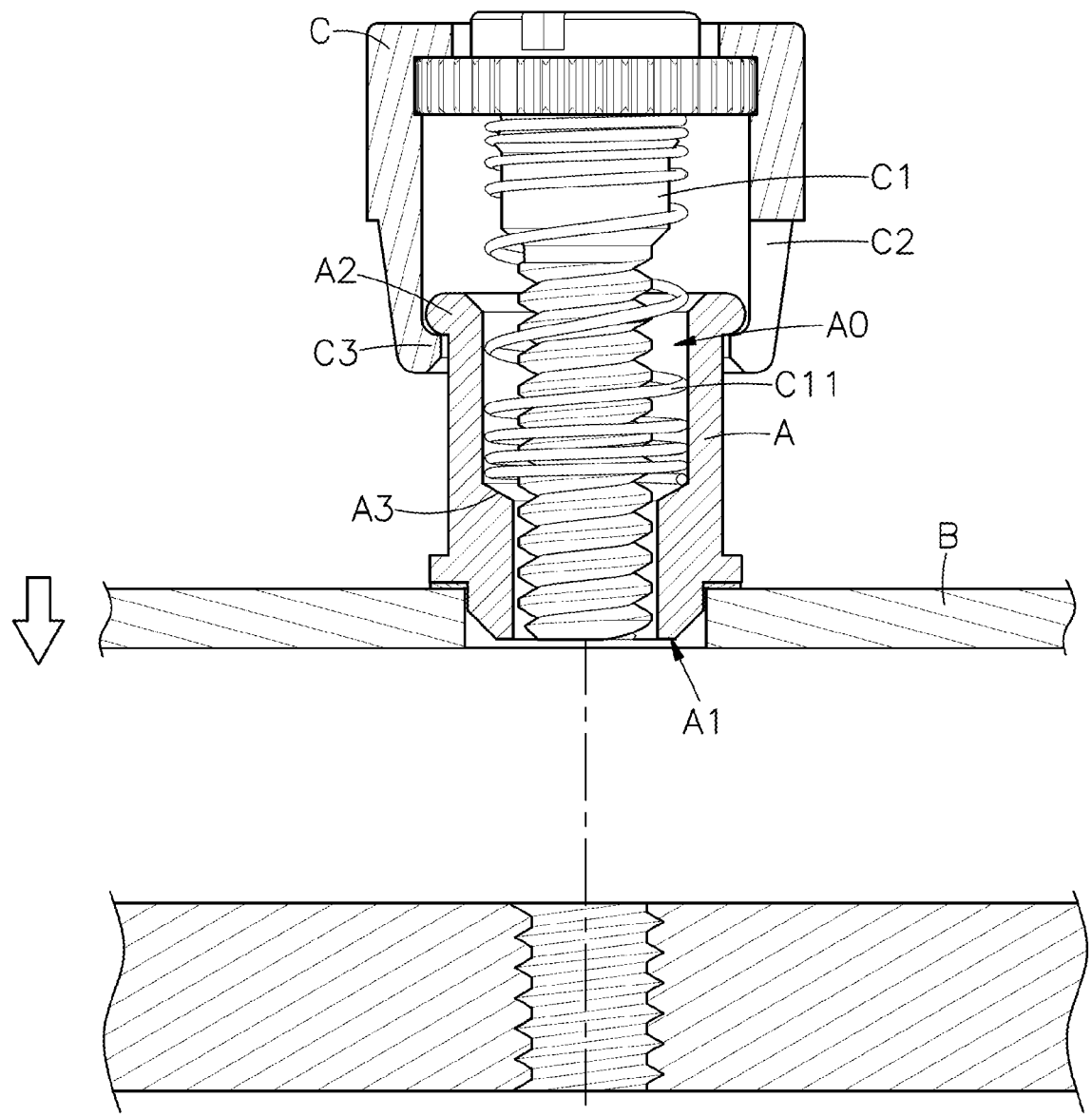
FIG. 10 illustrates a floating fastener according to the prior art.

Referring to FIG. 9 and FIGS. 2, 3, 4 and 6 again, the center opening 10 of the mounting base member 1 can be a stepped hole having relatively larger upper part that defines an inside chamber 101 and an annular step 102. Further, a spring member 24 can be sleeved onto the screw rod 23 and shoulder 22 of the rotary fastening member 2 and stopped between the flat bottom wall 211 of the head 21 of the rotary fastening member 2 and the annular step 102 of the mounting base member 1 to push the head 21 of the rotary fastening member 2 in direction away from the mounting base member 1.

In general, the invention provides a floating fastener, which comprises a mounting base member 1 affixed to a first panel member 4, a rotary fastening member 2 adapted for fastening to a second panel member 5 to lock the first panel member 4 to the second panel member 5, and a cap member 3, wherein the mounting base member 1 comprises a center opening 10 axially extending through opposing top and bottom sides thereof, a relatively smaller lower outer perimeter 11, a relatively larger upper outer perimeter 12, a bottom mounting neck 13, and a cushion ring 141 mounted in a locating groove 14 around the lower outer perimeter 11; the rotary fastening member 2 comprises a head 21 suspending above the mounting base member 1, an engagement portion 212 extending around the periphery of the head 21, a shoulder 22 perpendicularly downwardly extended from a center area of a flat bottom wall 211 of the head 21 and inserted into the center opening 10 of the mounting base member 1, and a screw rod 23 axially extended from a bottom end of the shoulder 22 opposite to the head 21 in a concentric manner; the cap member 3 comprises an accommodation open space 30 surrounded by an inside wall thereof and extending through opposing top and bottom sides thereof, an inside locating groove 301 extending around the inside wall near the top side and forced into engagement with the engagement portion 212 of the rotary fastening member 2, an inside bottom stop flange 31 extended around the inside wall at a bottom side of the accommodation open space 30, and a grip 32 formed integral with and extending around the periphery thereof and comprising a plurality of tool gripping planes 321 and finger gripping portions 33 alternatively arranged around the periphery of the cap member 3. Through the tool gripping planes 321 and finger gripping portions 33 of the grip 32, the user can rotate the cap member 3 directly with the fingers or by means of a hand tool or power hand tool to drive the screw rod 23 into or out of a mounting screw hole 51 of the second panel member 5.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A floating fastener installed in a mounting through hole of a first panel member and adapted for detachably locking said first panel member to a mounting screw hole of a second panel member, the floating fastener comprising:
   a mounting base member comprising opposing top side and bottom side, a center opening vertically extending through said opposing top and bottom sides, a bottom mounting neck downwardly extended from said bottom side around said center opening and affixed to said first panel member, a lower outer perimeter and an upper outer perimeter extending around said center opening at different elevations, said upper outer perimeter having an outer diameter larger than said lower outer perimeter, a tapered outer surface portion connected between said lower outer perimeter and said upper outer perimeter around said center opening, a locating groove extending around said lower outer perimeter near said bottom mounting neck, a cushion ring mounted in said locating groove around said lower outer perimeter, and an outer stop flange extending around a top side of said upper outer perimeter;
   a rotary fastening member axially movably mounted in said mounting base member, said rotary fastening member comprising a head suspending above said mounting base member, a shoulder perpendicularly downwardly extended from a flat bottom wall of said head and a screw rod axially downwardly extended from said shoulder in a concentric manner and adapted for threading into said mounting screw hole of said second panel member; and
   a cap member affixed to said head of said rotary fastening member, said cap member comprising an accommodation open space surrounded by an inside wall thereof and extending through opposing top and bottom sides thereof, an inside locating groove extending around the inside wall near the top side thereof for engagement with the periphery of said head of said rotary fastening member, an inside bottom stop flange extended around the inside wall thereof at a bottom side of said accommodation open space and coupled to said mounting base member axially slidably along said lower outer perimeter, said tapered outer surface portion and said upper outer perimeter of said mounting base member and stoppable at a bottom side of said outer stop flange of said mounting base member.

2. The floating fastener as claimed in claim 1, wherein said cap member further comprises a grip formed integral with and extending around the periphery thereof, said grip comprising a plurality of tool gripping planes and finger gripping portions alternatively arranged around the periphery of said cap member.

3. The floating fastener as claimed in claim 1, wherein said cap member further comprises a grip formed integral with and extending around the periphery thereof, said grip comprising a plurality of tool gripping planes and finger gripping portions alternatively arranged around the periphery of said cap member, each said finger gripping portion being selectively made in a series of longitudinal teeth, an embossed pattern, or an array of raised portions.

4. The floating fastener as claimed in claim 3, wherein said finger gripping portions of said cap member are made in the form of a series of longitudinal teeth, an embossed pattern or an array of raised portions.

5. The floating fastener as claimed in claim 3, wherein said tool gripping planes of said cap member are selectively made in a square configuration, hexagonal configuration or polygonal configuration.

6. The floating fastener as claimed in claim 1, wherein said center opening of the mounting base member is a stepped hole having relatively larger upper part that defines an inside chamber and an annular step.

7. The floating fastener as claimed in claim 1, wherein said mounting base member further comprises a mounting groove extending around the periphery of said bottom mounting neck.

8. The floating fastener as claimed in claim 1, wherein said cushion ring defines a tapered top guide surface portion and a bottom bearing surface portion.

9. The floating fastener as claimed in claim 1, wherein said outer stop flange of said mounting base member defines a tapered top thrust surface portion and a flat bottom stop surface portion.

10. The floating fastener as claimed in claim 1, wherein said outer stop flange has a diameter larger than the diameter of said upper outer perimeter and the outer diameter of said cushion ring.

11. The floating fastener as claimed in claim 1, wherein said cap member is directly molded on said head of said rotary fastening member by insert molding.

12. The floating fastener as claimed in claim 1, wherein said upper outer perimeter is relatively larger in diameter than said lower outer perimeter and relatively shorter than said lower outer perimeter in height.

13. The floating fastener as claimed in claim 1, wherein said tapered outer surface portion of said mounting base member slopes downwardly inwardly in direction from said upper outer perimeter toward said lower outer perimeter.

\* \* \* \* \*